US011802325B2

(12) United States Patent
Mann et al.

(10) Patent No.: US 11,802,325 B2
(45) Date of Patent: Oct. 31, 2023

(54) ALUMINUM ALLOY FOR ADDITIVE TECHNOLOGIES

(71) Applicant: OBSHCHESTVO S OGRANICHENNOY OTVETSTVENNOST'YU OBEDINENNAYA KOMPANIYA RUSAL "INZHERNO-TEKHNOLOGICHESKIY TSENTR", Krasnoyarsk (RU)

(72) Inventors: Viktor Khrist'yanovich Mann, Krasnoyarsk (RU); Aleksandr Yur'evich Krokhin, Krasnoyarsk (RU); Roman Olegovich Vakhromov, Krasnoyarsk (RU); Dmitrij Konstantinovich Ryabov, Krasnoyarsk (RU); Vladimir Aleksandrovich Korolev, Krasnoyarsk (RU); Dmitrij Vladimirovich Tsisar', Krasnoyarsk (RU)

(73) Assignee: OBSHCHESTVO S OGRANICHENNOY OTVETSTVENNOST'YU OBEDINENNAYA KOMPANIYA RUSAL "INZHERNO-TEKHNOLOGICHESKIY TSENTR", Krasnoyarsk (RU)

( * ) Notice: Subject to any disclaimer, the term of this patent is extended or adjusted under 35 U.S.C. 154(b) by 0 days.

(21) Appl. No.: 17/100,578

(22) PCT Filed: May 21, 2018

(86) PCT No.: PCT/RU2018/000313
§ 371 (c)(1),
(2) Date: Nov. 20, 2020

(87) PCT Pub. No.: WO2019/226063
PCT Pub. Date: Nov. 28, 2019

(65) Prior Publication Data
US 2021/0246535 A1    Aug. 12, 2021

(51) Int. Cl.
*C22C 21/06* (2006.01)
*B33Y 70/00* (2020.01)
(Continued)

(52) U.S. Cl.
CPC .............. *C22C 21/06* (2013.01); *B22F 1/145* (2022.01); *B22F 9/082* (2013.01); *B33Y 70/00* (2014.12);
(Continued)

(58) Field of Classification Search
CPC ........ B22F 1/0088; B22F 9/082; C22C 1/026; C22C 1/03
See application file for complete search history.

(56) References Cited

U.S. PATENT DOCUMENTS

2009/0226340 A1    9/2009  Marya
2009/0263275 A1*  10/2009  Pandey ................... C22C 21/06
                                                  148/693
(Continued)

FOREIGN PATENT DOCUMENTS

CN    1873035 A    12/2006
CN    101594952 A  12/2009
(Continued)

OTHER PUBLICATIONS

Dietrich S., et al.; "A New Approach For A Flexible Powder Production For Additive Manufacturing"; Procedia Manufacturing; 6, p. 88-95, 2016 (Year: 2016).*
(Continued)

*Primary Examiner* — Kevin E Yoon
*Assistant Examiner* — Austin Pollock
(74) *Attorney, Agent, or Firm* — Baker & McKenzie LLP

(57) ABSTRACT

The present disclosure relates to metallurgy, more particularly to a composition and a process for producing part
(Continued)

blanks and finished parts from aluminum-based alloys including but not limited to using selective laser melting processes. The proposed aluminum-based alloy comprising magnesium, zirconium and scandium for atomization an aluminum powder therefrom and subsequent producing finished parts by additive technologies has a reduced content of scandium and further comprises oxygen and calcium with a limited size of the oxide film and a moister content.

3 Claims, 4 Drawing Sheets

(51) Int. Cl.

| | | |
|---|---|---|
| *B22F 9/08* | (2006.01) | |
| *C22C 1/02* | (2006.01) | |
| *C22C 1/04* | (2023.01) | |
| *B22F 1/145* | (2022.01) | |
| *B22F 9/06* | (2006.01) | |
| *B22F 10/28* | (2021.01) | |
| *B22F 10/40* | (2021.01) | |
| *B22F 10/36* | (2021.01) | |
| *B22F 10/366* | (2021.01) | |

(52) U.S. Cl.
CPC ............ *C22C 1/026* (2013.01); *C22C 1/0416* (2013.01); *B22F 10/28* (2021.01); *B22F 10/36* (2021.01); *B22F 10/366* (2021.01); *B22F 10/40* (2021.01); *B22F 2009/065* (2013.01); *B22F 2009/0824* (2013.01); *B22F 2009/0848* (2013.01); *B22F 2202/11* (2013.01); *B22F 2301/052* (2013.01); *B22F 2999/00* (2013.01)

(56) References Cited

U.S. PATENT DOCUMENTS

| | | | |
|---|---|---|---|
| 2010/0143185 A1 | 6/2010 | Pandey | |
| 2017/0121794 A1 | 5/2017 | Lenczowski | |
| 2017/0165795 A1 | 6/2017 | Lenczowski | |
| 2017/0233857 A1 | 8/2017 | Lenczowski | |
| 2018/0193916 A1* | 7/2018 | Lou | B33Y 10/00 |

FOREIGN PATENT DOCUMENTS

| | | | | |
|---|---|---|---|---|
| CN | 101863307 A | | 10/2010 | |
| CN | 104507601 A | | 4/2015 | |
| CN | 104651683 A | * | 5/2015 | |
| CN | 105764634 A | | 7/2016 | |
| CN | 106222502 A | | 12/2016 | |
| CN | 107385294 A | | 11/2017 | |
| CN | 107881382 A | | 4/2018 | |
| DE | 102011111365 A1 | | 2/2013 | |
| EP | 2112243 A1 | * | 10/2009 | ............ C22F 1/047 |
| EP | 2646587 B1 | | 10/2017 | |
| EP | 2112239 B1 | | 5/2019 | |
| JP | 2007092117 A | | 4/2007 | |
| RU | 2251585 C2 | | 5/2005 | |
| RU | 2368687 C2 | | 9/2009 | |
| WO | WO-2013029589 A1 | * | 3/2013 | ............ C22C 21/06 |

OTHER PUBLICATIONS

J.L. Murray; "The Al—Zr (Aluminum-Zirconium) System"; Alcoa Technical Center; J. of Phase Equilibria; vol. 13, No. 3, 1992; Figure 4 (Year: 1992).*

J.L. Murray; "The Al—Sc (Aluminum-Scandium) System"; Alcoa Laboratory; J. of Phase Equilibria; vol. 19, No. 4, 1998; Figure 3 (Year : 1998).*

Leon G.P.; et al. "Gas Atomization of Molten Metal: Part I. Numerical Modeling Conception"; Research Paper, (Year: 2016).*

Ikeshita S.; et al.; "Hardness and microstructural variation of Al—Mg—Mg—Sc—Zr alloy"; J. Micron; p. 1-8 (Year: 2016).*

Spierings A.B., et al.; "Microstructure characterization of SLM-processed Al—Mg—Sc—Zr alloy in the heat treated and HIP condition"; Additive Manufacturing; vol. 20, p. 173-181 (Year: 2018).*

ASM Handbook, "Atomization", vol. 7, Powder Metallurgy, p. 58-71 (Year: 2015).*

GOST 11069-2001, Primary Aluminum, "Grades". Interstandard (Russia) 2004.

GOST 1497-1984. Metals, "Methods of Tension Test". Interstandard (Russia) 2005.

Mustafa et al., "Comparison of Microstructure and Mechanical Properties of Scalmalloy Produced by Selective Laser Melting and Laser Metal Deposition Materials", vol. 11, No. 1, Dec. 23, 2017, 17 pages.

International Search Report and Written Opinion dated Feb. 5, 2019 in connection with International Application No. PCT/RU2018/000313, 10 pages.

Lin Song et al., "Probing the Microstructure in Pure Al & Cu Melts: Theory Meets Experiment", Frontiers in Chemistry, Aug. 7, 2020, vol. 8, Article 607, 7 pages.

Muna Saeed Khushaim, "Investigation of the Precipitation Behavior in Aluminum Based Alloys", Material Science and Engineering, King Abdullah University of Science and Technology, Thuwal, Kingdom of Saudi Arabia, Nov. 2015, 205 pages.

E.A. Marquis et al., "Nanoscale Structural Evolution of Al3Sc Precipitates in Al(Sc) Alloys", Department of Material Science and Engineering, Evanstan, Illinois, Elsevier Science Ltd., Nov. 12, 2000, 11 pages.

Search Report dated Aug. 28, 2019 in connection with Russian Patent Application No. 2019103463, 2 pages.

Examination Report dated May 19, 2021 in connection with Indian Patent Application No. 201927029202, 6 pages.

Office Action dated Sep. 8, 2021 in connection with Chinese Application No. 2018800070585, 3 pages.

* cited by examiner

ALUMINUM ALLOY FOR ADDITIVE TECHNOLOGIES

CROSS-REFERENCE TO RELATED APPLICATIONS

This application is a continuation of and claims priority to PCT Application No. PCT/RU2018/000313 filed May 21, 2018. The contents from the above are hereby incorporated in their entirety by reference.

FIELD OF THE DISCLOSURE

The present disclosure relates to the field of aluminum metallurgy and can be used for producing part blanks and finished parts from aluminum based alloys, including but not limited to using selective laser melting (SLM) processes.

BACKGROUND OF THE DISCLOSURE

At present, aluminum alloys based on Al—Si and Al—Mg—Sc systems are widely used to produce various parts using additive technologies.

Known is $AlSi_{10}Mg$ aluminum alloy used in a powder form to produce finished parts with additive technologies. Although said alloy has good processability and allows to achieve mechanical properties at the level of cast alloys. But this level of characteristics is insufficient to compete with high-strength wrought alloys.

Scandium-containing materials allow the strength of up to 500-550 MPa to be achieved so that such materials may find a wider range of applications. However a high cost of scandium at present results in a low interest of designers and process engineers in the use of these materials.

Accordingly, there exists an actual problem of developing high-strength and reasonably priced new materials for additive technologies.

Known is an aluminum alloy for producing parts by additive technologies, comprising (in wt. %):
Zn-4-10;
Mg-1-3.5;
Zr-0-0.5;
Cu-0-2.5;
Sc-0-1.25;
Aluminum-base (see US patent application No. 20170233857, published on 17 Aug. 2017, C22F1/053; B33Y10/00; B33Y70/00; B33Y80/00; C22C21/10).

A drawback of the known aluminum alloy is a high content (4 to 10 wt. %) of zinc which is evaporated during the process of producing finished parts by additive technologies. In addition, quenching is required for achieving high level of tensile properties, which may cause various distortions during heat treatment and result in a longer time for producing finished parts.

Known is an aluminum alloy for producing part blanks by additive technologies (see US patent application No. 2017121794, published on 4 May 2017, C22C21/08; B22F1/00; C22F1/05; C23C4/08), comprising (in wt. %):
Mg—3-6;
Si—1-4;
Ti—0.005-0.2;
Sc—0.1-0.75;
Zr—0.01-0.375;
Hf, Mo, Tb, Nb, Gd, Er, V-0-0.5;
Be—0-0.004;
Aluminum-base;
wherein the content of zirconium or the aggregate content of zirconium and titanium is less than 50% of the content of scandium.

A drawback of this alloy is a high silicon content (1 to 4 wt. %) which substantially improves the casting properties but results in forming coarse excess phases lowering the material plasticity characteristics due to a poor coherency to the aluminum matrix.

Known is an alloy according to US patent application No. 20170165795, published on 15 Jun. 2017, B23K35/28; C22C21/08, disclosing an aluminum powder alloy comprising (in wt. %):
Mg—0.5-10;
Sc—0.1-30;
Zr—0.05-1.5;
Mn—0.01-1.5;
Zn—0-2.0;
Ti—0.01-0.2;
Ce≤0.25;
Be—0-0.004;
B—0-0.008;
Si≤0.25;
Fe≤0.25;
Hf≤0.5;
at least one element which is selected from the group consisting of the lanthanum group except for Ce, Y, Ga, Nb, Ta, W, V, Ni, Co, Mo, Li, Th, Ag, wherein the proportion of these elements is at most 0.5; and
aluminum as the remainder.

A drawback of the claimed aluminum alloy is a high material cost due to a high content of scandium (up to 30 wt. %) and other rare elements; in addition, over alloying of the material results in lower plasticity and fatigue characteristics.

A technical problem to be solved by the proposed disclosure is to develop an aluminum powder for producing high-strength and reasonably priced part blanks and finished parts by additive technologies.

SUMMARY

According to some embodiments, the present disclosure relates to a method for producing an aluminum powder from an aluminum-based alloy, the method including (a) adding a scandium and a zirconium batch-wise as alloying elements to an aluminum melt at a temperature from 850-950° C. to avoid super cooling of the aluminum melt to a temperature below 750° C.; (b) adding calcium as master alloy after dissolution of scandium; (c) adding magnesium; and (d) atomizing the melt using a nitrogen-oxygen or argon-oxygen mixture to obtain an aluminum powder while maintaining the following ratio of the melt composition components before atomization (wt. %):
magnesium 4.0-6.5;
zirconium 0.5-1.0;
scandium 0.2-0.6;
calcium 0.005-0.2; and
aluminum and inevitable impurities remainder.

In some embodiments, a disclosed method includes spraying the melt with an oxygen content of 0.2-1.0% at a temperature 160-250° C. above an alloy liquidus point. A spherical powder includes a particle size of 20 to 150 μm, preferably 20-63 μm. A method may include at least one of producing a finished part produced from the spherical powder by selective laser alloying; and producing a finished part produced from the spherical powder by electron-beam alloying.

In some embodiments, the present disclosure relates to an aluminum-based alloy comprising magnesium, zirconium and scandium for atomization an aluminum powder therefrom and subsequent producing finished parts by additive technologies, characterized in that the aluminum-based alloy has a reduced scandium content and further includes oxygen and calcium at the following ratio of components (wt. %):
magnesium 4.0-6.5;
zirconium 0.5-1.0;
scandium 0.2-0.6;
calcium 0.005-0.2; and
aluminum and inevitable impurities remainder An aluminum-based alloy may include a spherical powder having a particle size of 20 to 150 μm. A spherical powder may have a particle size of 20-63 μm. In some embodiments, a spherical powder may contain a finished part formed by a selective laser alloying or electron-beam alloying processes.

BRIEF DESCRIPTION OF THE DRAWINGS

Some embodiments of the disclosure may be understood by referring, in part, to the present disclosure and the accompany drawings, wherein.

DETAILED DESCRIPTION

Figure 1:
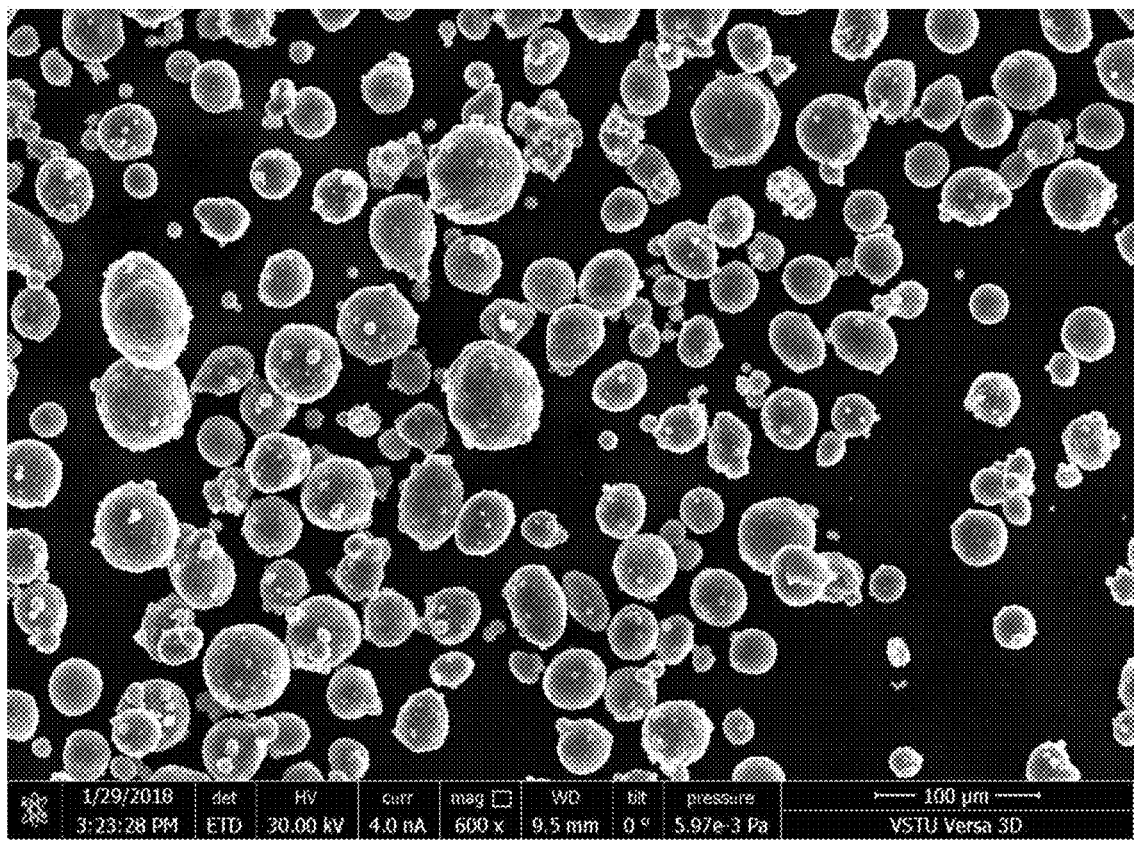
FIG. 1 is a photograph illustrating aluminum powder particles, according to a specific example embodiment of the disclosure.

According to some embodiments, the present disclosure relates to producing an aluminum alloy with high-strength properties (ultimate tensile strength of at least 470 MPa) and an increased elongation level of at least of 11% and its powder for producing part blanks and finished parts by additive technologies. A distinctive feature is a low powder cost due to its optimized composition and a lower concentration of expensive elements compared to the closest prior art so that the production costs of finished parts may be substantially reduced due to the use of less expensive feed stock. The powder may be used for producing high-loaded finished parts for use, among other things, under exposure to an impact load requiring improved strength and plastic characteristics.

Said problem is solved and said effect is achieved by preparing a powder having the proposed chemical composition (in wt. %):
Mg 4.0-6.5;
Zr 0.5-1.0;
Sc 0.2-0.6;
O 0.001-0.2;
Ca 0.005-0.2;
Al and inevitable impurities as the remainder.

The content of magnesium in the alloy is limited because a narrow crystallization range has to be provided to improve processability as articles and parts are produced by selective laser melting. A content of magnesium higher than 6.5 wt. % of the alloy will result in an undesirable effect of reduced corrosion resistance because the $Al_3Mg_2$ phase tends to nucleate at the grain boundary leading to a fraction due to stress corrosion cracking. The content of scandium is limited because its maximum solubility at a room temperature is 0.02 wt. % and its maximum solubility does not exceed 0.8 wt. %, which makes it possible to avoid for sure formation of primary intermetalics both in the powder as such and in the produced finished parts. Alloying both with scandium and zirconium allows scandium to be partly replaced to form the $Al_3(Sc, Zr)$ phase which has an increased heat resistance and efficiently hardens the material in case of correctly selected heat treatment parameters.

Oxygen is necessary to provide the required sphericity and reduced reactivity of the powder. An increased oxygen content of above 0.2 wt. % will result in a lower quality of the particle surface and disturbed spherical shape. Addition of calcium prevents aluminum oxide from being formed along the boundaries of the synthesized material in the process of repeated remelting. In addition, in the process of subsequent heat treatment, $Al_4Ca$-type phase is formed to enable the grain retirement effect so that the micro grain size becomes smaller and the strength characteristics improve.

Due to the general alloying level of the material with a small amount of transition metals compared to the closest prior art, improved elongation characteristics are provided. In addition, a further effect consists in preventing magnesium from burning out in the process of the melt preparation and spraying.

As a feed stock for producing an alloy, aluminum of a purity grade not lower than A5 according to GOST 11069 (with the content of aluminum not lower than 99.5%) is generally used. The impurities present in the metal are below the limit of their maximum solubility and have no significant effect on the characteristics of the final specimens because of being found in a solid solution or as inter-metallides at a volume ratio of less than 0.1%.

Importantly, the proposed alloy contains no additives of manganese and titanium because the hardening achievable due to the ageing of an aluminum solid solution with these transition metals (TM) is manifested far less than due to the disintegration of a zirconium and scandium solid solution in aluminum. In addition, the modifying effect of these additives is manifested less than in case of introducing zirconium, making unpractical introducing these additives. An increased content of intermetallics in the alloy may also decrease their resistance to pitting corrosion.

EXAMPLES

Example 1

An aluminum powder was obtained as follows: scandium and zirconium were added batch-wise as alloying elements to an aluminum melt of a grade not lower than A7 according to GOST 11069 at a temperature of 850-950° C. to avoid supercooling of the melt to a temperature below 740° C. Calcium was added as alloying element after dissolution of scandium and zirconium.

After complete dissolution of the aluminum-calcium master alloy, magnesium was added at a temperature not above 820° C., melt specimens were selected and the chemical composition was adjusted.

Immediately before atomization, the chemical composition was finally inspected and additional alloying was performed as appropriate.

After obtaining the required chemical composition, the melt was atomized using a nitrogen-oxygen or argon-oxygen mixture containing 0.2-1.0% of oxygen at a cooling rate not lower than $5.10^4$ K/s to produce an oversaturated solid solution. The melt was sprayed at a temperature 160-250° C. above a liquidus point to avoid the presence of fine primary intermetallides of zirconium and scandium in the melt. Once produced, the powder was separated to sift out the fraction of below 20 μm and above 63 μm or above 130 μm depending on the requirements.

The powder morphology was studied by scanning electron microscopy. Photographs illustrating the particles of the produced aluminum powder are shown in FIG. 1.

The oxygen content in the powder was studied using Leco gas analyzer depending on the oxygen content in the gas carrying mixture. The oxygen content varied from 0.2% to 2%.

The following results were obtained:

| Oxygen content in nitrogen, % | Oxygen content in the powder, wt. % |
| --- | --- |
| 0.2 | 0.003 |
| 0.6 | 0.08 |
| 1.0 | 0.19 |
| 2.0 | 0.36 |

Laser diffraction was used to determine the dispersion degree of the aluminum powder. The following results were obtained: $d_{10}$=12.7 μm, $d_{50}$=33.1 μm, $d_{90}$=59.8 μm.

Example 2

Part blanks were produced from the above powder according to Example 1 by selective laser melting.

Figure 2:
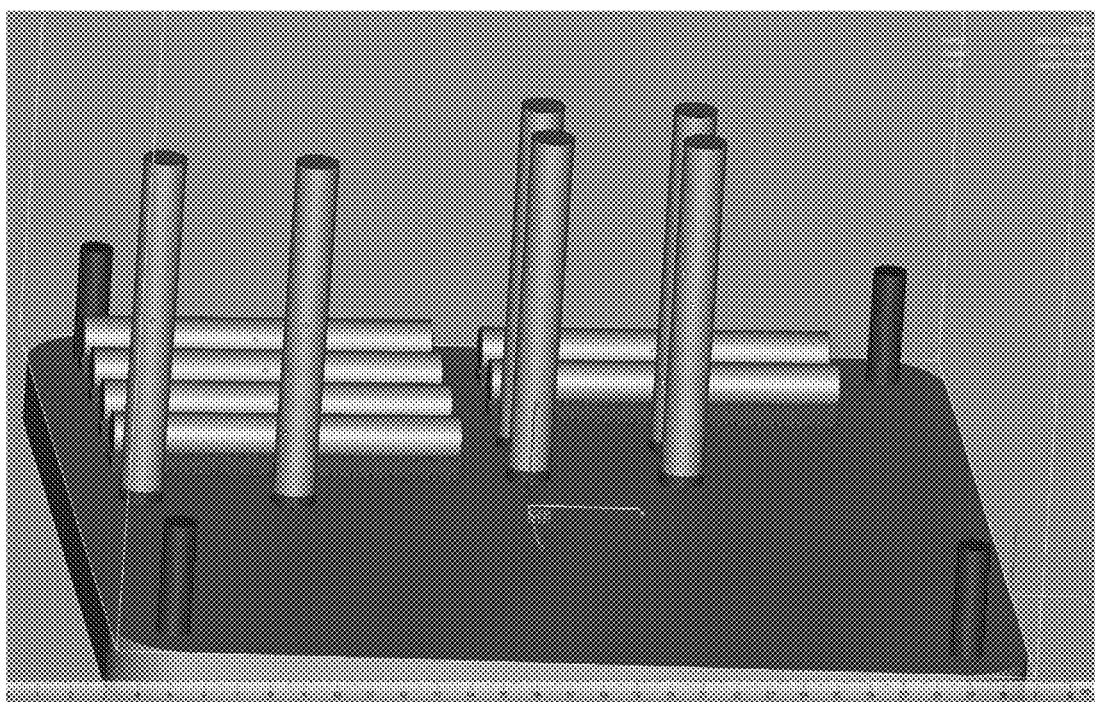
FIG. 2 is a digital 3D model of the arrangement of specimens at the platform for selective laser alloying, according to a specific example embodiment of the disclosure.

A digital 3D model of an article (for example of specimens for tensile testing as shown in FIG. 2) was generated using CAD (SolidWorks, Catia, Creo, NX, Compas 3D), and then stored as a STL. The resulting file was then loaded to the machine. The 3D model was divided into layers (each of 30 μm in thickness) using special software packages. An article from the metal powder was produced based on these layers.

A certain amount of powder was transferred from an additional platform or from a hopper to the main operating platform. The platform comprises a removable metal plate. The plate is made of a material having a base similar to that of the powder for printing. Parts to be produced are attached to the plate by means of special supporting structures (emphasized in red in FIG. 2). The supporting structures are removed after printing.

The powder was flatly spread throughout the platform by means of a special doctor blade which may comprise a cylinder, a metal or ceramic blade.

The powder particles were melted along a predetermined contour by exposure to 180 Watt laser radiation. Printing process was then performed by repeatedly applying the powder layers and alloying the same along a predetermined contour.

Once the printing process was completed, the excess of powder was removed from the chamber. The plate with the printed parts was withdrawn from the machine.

The parts were cut from the platform mechanically or by electric discharge cutting.

Figure 3:
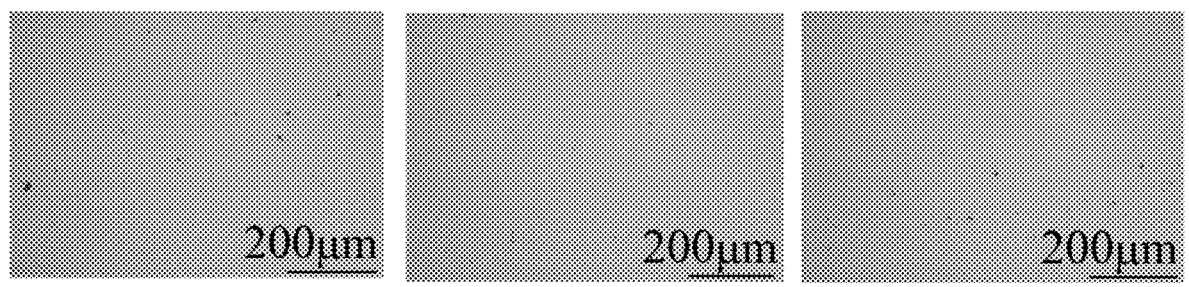
FIG. 3 is a photograph illustrating metallographic specimens produced from a powder according to the proposed alloy for determining porosity.

FIG. 3 shows a photograph illustrating a metallographic specimen grown according to the above process. The level of porosity does not exceed 0.35%.

Figure 4:
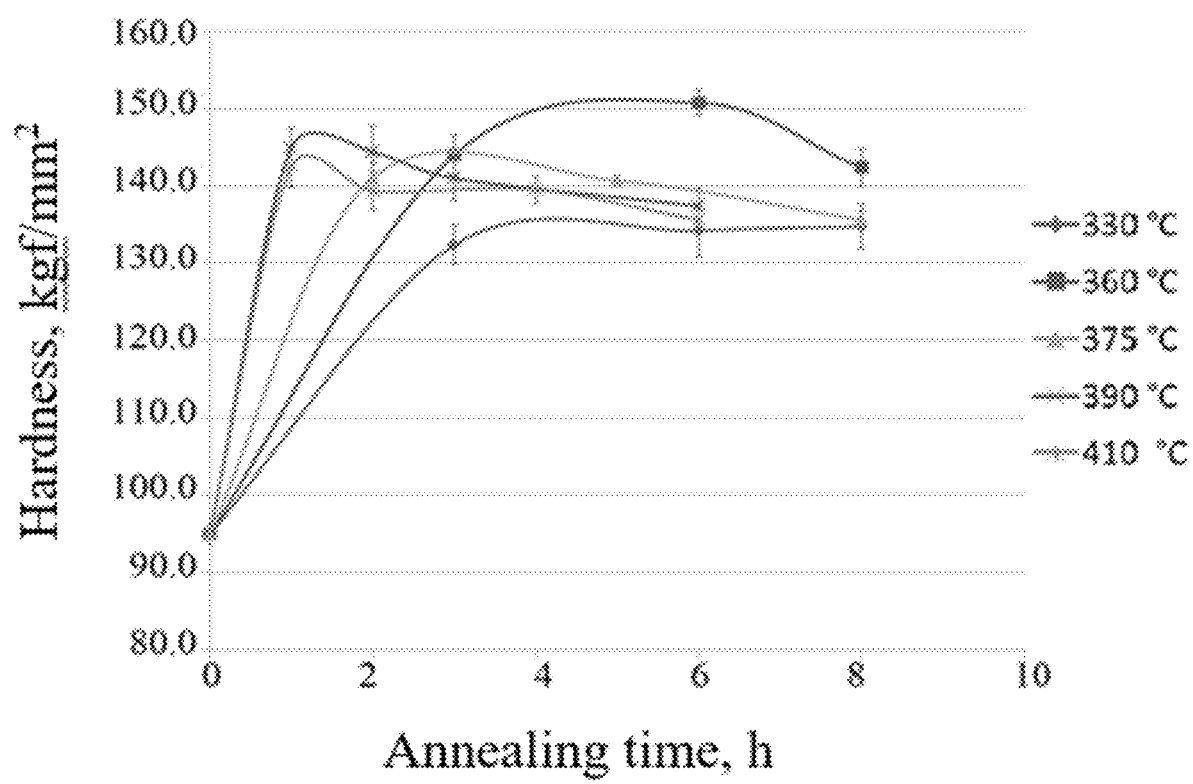
FIG. 4 is a graph illustrating a relationship between the hardness of specimens produced from the powder according to the proposed alloy and the annealing time and temperature in case of single-step annealing.

FIG. 4 shows a relationship between the hardness of specimens produced from the inventive aluminum-based alloy powder and the soaking time at different annealing temperatures. Based on the curve data analysis, heat treatment modes were determined for carrying out tensile tests of cylindrical specimens in accordance with the requirements of GOST 1497.

Table 1 shows the chemical composition of the powders under study.

Table 2 shows the tensile properties as determined after single-step annealing at 400° C.

TABLE 1

| | Chemical composition in wt. % | | | | | | | | | |
| --- | --- | --- | --- | --- | --- | --- | --- | --- | --- | --- |
| No. | Al | Mg | Zr | Sc | Ca | O | Mn | Zn | Ti | Y |
| 1 | Base | 6.5 | 1.0 | 0.2 | 0.01 | 0.01 | — | — | — | — |
| 2 | | 4.8 | 0.7 | 0.35 | 0.005 | 0.2 | — | — | — | — |
| 3 | | 4.0 | 0.5 | 0.6 | 0.2 | 0.005 | — | — | — | — |
| 4 | | 4.0 | 0.5 | 0.6 | 0.18 | 0.38 | — | — | — | — |
| Prototype | | 5.0 | 0.7 | 0.9 | — | — | 0.5 | 0.5 | 0.05 | 0.05 |

TABLE 2

| | Tensile properties | | |
| --- | --- | --- | --- |
| No. | Ultimate strength, MPa | Tensile yield point, MPa | Elongation, % |
| 1 | 475 | 445 | 14.0 |
| 2 | 480 | 455 | 13.5 |
| 3 | 505 | 460 | 14.0 |
| 4 | 500 | 450 | 11.0 |
| Prototype | 510 | 470 | 10.0 |

As seen from the above Tables, an increase in the oxygen content leads to a certain reduction in elongation caused by the presence of the oxide phase in the alloyed material, said oxide phase being sufficiently fine to maintain the hardening effect but having no affinity for the aluminum matrix.

The powder cost was calculated based on the 35% yield of the required fraction and the use of the following feed stock:
A7 aluminum ingots;
Mg95 magnesium ingots;
aluminum-2% scandium master alloy;
aluminum-10% zirconium master alloy;
aluminum-10% yttrium master alloy;
Z0 grade zinc metal;
aluminum-6% calcium master alloy;
aluminum-5% titanium master alloy.

Cost savings in the preparation of the proposed alloy estimated versus the prototype are shown in Table 3 below.

TABLE 3

| | Composition 1 | Composition 2 | Composition 3 |
| --- | --- | --- | --- |
| Reduction in the amount of scandium used per 1 ton of the alloy compared to the prototype | 7 kg | 5.5 kg | 3 kg |
| Reduction in the amount of the Al-2%Sc preliminary alloy used per 1 ton of the alloy compared to the prototype | 350 kg | 275 kg | 150 kg |
| Cost savings per 1 ton of the | $17,500 | $13,750 | $7,500 |

TABLE 3-continued

| | Composition 1 | Composition 2 | Composition 3 |
|---|---|---|---|
| alloy due to reduced alloying with scandium compared to the prototype | | | |

As a result of reducing the scandium content to 0.2-0.6 wt. % and the cost of Al-2% Sc preliminary alloy to 50 $/kg, a cost saving by $7,500-$17,500 per 1 ton of the alloy is achieved compared to the prototype (US 20170165795). At the same time, the proposed alloy is similar in terms of the tensile strength to its high-scandium content prototype while having an elongation value higher by 20-30% so that it may be used to manufacture structural elements able to withstand severe strains. In this regard, the engineering and economic performance according to the claimed disclosure is far higher than that of the prototype.

The invention claimed is:

1. A method for producing an aluminum powder from an aluminum-based alloy, the method comprising:

(a) adding a scandium and a zirconium batch-wise as master alloys to an aluminum melt at a temperature from 850-950° C. to avoid super cooling of the aluminum melt to a temperature below 750° C.;

(b) adding calcium as a master alloy after dissolution of scandium;

(c) adding magnesium; and (d) atomizing the aluminum melt using a nitrogen-oxygen or argon-oxygen mixture with an oxygen content of 0.2-1.0 vol. % to obtain the aluminum powder while maintaining the following ratio of the aluminum melt composition components before atomization (wt. %):

magnesium 4.0-6.5;

zirconium 0.5-1.0;

scandium 0.2-0.6;

calcium 0.005-0.15; and aluminum and inevitable impurities being remainder components.

2. The method according to claim 1, further comprising atomizing the aluminum melt at a temperature of 160-250° C. above an alloy liquidus point of the aluminum-based alloy.

3. The method according to claim 1, wherein the aluminum powder comprises a particle size of 20 to 150 μm.

* * * * *